US011089277B2

(12) United States Patent
Fukano et al.

(10) Patent No.: US 11,089,277 B2
(45) Date of Patent: Aug. 10, 2021

(54) PROJECTION APPARATUS, INSTALLED STATE DETECTION METHOD AND MEDIUM

(71) Applicant: CASIO COMPUTER CO., LTD., Tokyo (JP)

(72) Inventors: Kazuyasu Fukano, Hachioji (JP); Hiroshi Saito, Akishima (JP); Tetsuro Narikawa, Hamura (JP); Shunsuke Hara, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/090,105

(22) Filed: Nov. 5, 2020

(65) Prior Publication Data

US 2021/0144349 A1 May 13, 2021

(30) Foreign Application Priority Data

Nov. 7, 2019 (JP) .............................. JP2019-202468

(51) Int. Cl.
*H04N 9/31* (2006.01)
*G01C 9/06* (2006.01)

(52) U.S. Cl.
CPC ............. *H04N 9/3194* (2013.01); *G01C 9/06* (2013.01); *H04N 9/3141* (2013.01)

(58) Field of Classification Search
CPC .. H04N 9/3194; H04N 9/3185; H04N 9/3141; H04N 9/31; G01C 9/06; G06T 3/00
USPC ..... 348/744, 745, 747; 345/204; 353/39, 69, 353/70
See application file for complete search history.

(56) References Cited

U.S. PATENT DOCUMENTS

2010/0165302 A1\* 7/2010 Ozawa ................. G03B 21/147
353/70
2011/0216047 A1\* 9/2011 Ozawa ..................... G09G 5/00
345/204

FOREIGN PATENT DOCUMENTS

| JP | 2006-276446 A | 10/2006 |
|---|---|---|
| JP | 2010-049007 A | 3/2010 |
| JP | 2015-001582 A | 1/2015 |

\* cited by examiner

*Primary Examiner* — Sherrie Hsia
(74) *Attorney, Agent, or Firm* — Fitch, Even, Tabin & Flannery LLP

(57) ABSTRACT

The present invention aims to make it possible to detect deterioration of a housing of a projection apparatus and to notify a user of the deterioration of the housing. A projection apparatus includes at least one processor and an acceleration sensor which detects an inclination of the projection apparatus, in which the processor performs the processes of acquiring a difference between i) a first detection value which is detected by the acceleration sensor in a case where the projection apparatus is installed on an installation surface and ii) a second value which is detected by the acceleration sensor at a time which comes after the installation of the projection apparatus with the projection apparatus on the installation surface, and in a case where the difference becomes more than a threshold value, controlling to notify a warning at a predetermined timing by functioning as a notification unit or to stop functions of the projection apparatus.

17 Claims, 14 Drawing Sheets

PROJECTION APPARATUS, INSTALLED STATE DETECTION METHOD AND MEDIUM

CROSS-REFERENCE TO RELATED APPLICATIONS

This application is based upon and claims the benefit of priority under 35 USC 119 of Japanese Patent Application No. 2019-202468 filed on Nov. 7, 2019, the entire disclosure of which, including the description, claims, drawings, and abstract, is incorporated herein by reference in its entirety.

BACKGROUND OF THE INVENTION

1. Field of the Invention

The present invention relates to a projection apparatus, and an installed state detection method and a medium therefore.

2. Description of the Related Art

Now, as described in Japanese Patent Application Laid-Open No. 2010-49007, a projection apparatus that an external housing is made of a synthetic resin and an installation member which is used for installing an apparatus main body on a predetermined place is attached to the exterior housing is disclosed.

BRIEF SUMMARY OF THE INVENTION

According to one aspect of the present invention, there is provided a projection apparatus including at least one processor and an acceleration sensor which detects an inclination of the projection apparatus, in which the processor performs the processes of acquiring a difference between i) a first detection value which is detected by the acceleration sensor in a case where the projection apparatus is installed on an installation surface and ii) a second value which is detected by the acceleration sensor at a time which comes after the installation of the projection apparatus with the projection apparatus on the installation surface, and in a case where the difference becomes more than a threshold value, controlling to notify a warning at a predetermined timing by functioning as a notification unit or to stop functions of the projection apparatus.

According to another aspect of the present invention, there is provided an installed-state detection method for use in a projection apparatus which includes at least one processor and an acceleration sensor, including acquiring a difference between i) a first detection value which is detected by the acceleration sensor in a case where the projection apparatus is installed on an installation surface and ii) a second value which is detected by the acceleration sensor at a time which comes after the installation of the projection apparatus with the projection apparatus on the installation surface, and in a case where the difference becomes more than a threshold value, controlling to notify a warning at a predetermined timing by functioning as a notification unit or to stop functions of the projection apparatus.

According to still another aspect of the present invention, there is provided a non-transitory computer-readable medium in which a in which a program used for controlling a computer of a projection apparatus which includes at least one processor and an acceleration sensor which detects inclination is stored, in which a difference between i) a first detection value which is detected by the acceleration sensor in a case where the projection apparatus is installed on an installation surface and ii) a second value which is detected by the acceleration sensor at a time which comes after the installation of the projection apparatus with the projection apparatus on the installation surface is acquired, and in a case where the difference becomes more than a threshold value, a warning is notified at a predetermined timing by functioning as a notification unit or functions of the projection apparatus are stopped.

DETAILED DESCRIPTION OF THE INVENTION

In the following, a form for embodying the present invention will be described in detail with reference to each drawing. The present invention is made in order to detect deterioration of a housing and cracks in the housing in a case where a projector is installed in a ceiling-suspended state, in a wall-hung state and in a board-stand integrated state.

Figure 1:
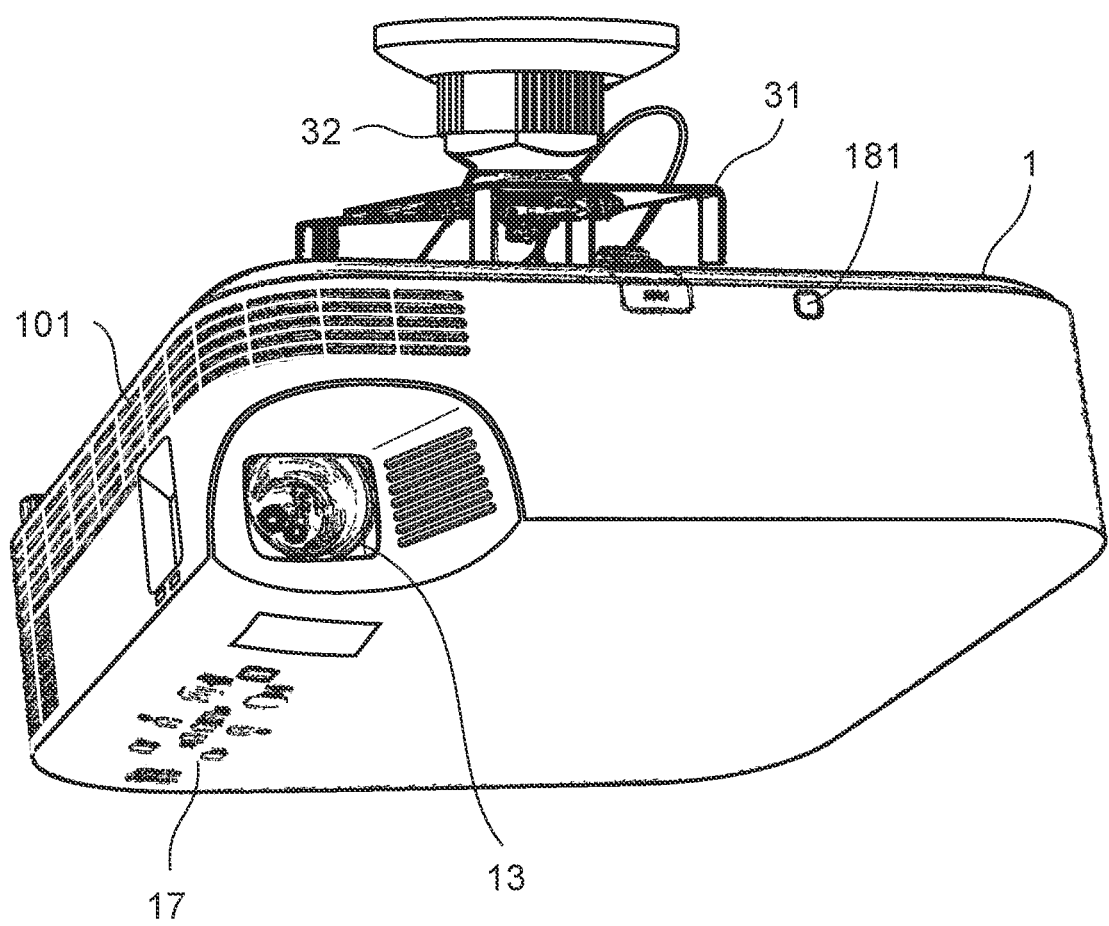
FIG. 1 is an outside view illustrating one example of a projector (a projection apparatus) according to one embodiment of the present invention.

FIG. 1 is an outside view illustrating one example of a projector (a projection apparatus) 1 according to one embodiment of the present invention. In FIG. 1, the projector 1 is installed in a state of turning upside down with a plate 31 being fixed to a lower surface of a housing of the projector 1 and a ceiling suspension metal fitting 32 is mounted on the plate 31. An installation surface of the projector 1 means a bottom surface of the projector 1 which is installed on a ceiling via the ceiling suspension metal fitting 32 and the plate 31. Incidentally, an upper surface of the housing of the projector 1 faces downward in FIG. 1. Incidentally, in the present embodiment, left-right of the projector 1 indicates a left-right direction relative to a projection direction and front-back thereof indicates a front-back direction relative to a direction toward the screen 2 (see FIG. 2) side of the projector 1.

The projector 1 is a DLP (Digital Light Processing) (a registered trademark) system projector. As illustrated in FIG. 1, the housing of the projector 1 is in the form of an almost cubic shape. The projector 1 includes a projection lens unit 13.

A plurality of intake/exhaust holes is formed in a front surface and side surfaces of the housing. In addition, a remote controller light receiving unit 181 which receives a control signal from a remote controller is disposed on the front surface of the housing of the projector 1.

The upper surface of the housing faces downward in FIG. 1 and an operation display unit 17 is disposed on the upper surface. Keys and indicators such as a power source switch key, a power indicator which notifies a user of turning on or off of a power source, a projection switch key for on/off switching of projection, an overheat indicator which notifies the user of overheat in a case where a light source device, a display element, a control circuit and so forth are overheated and so forth are arranged on the operation display unit 17.

Figure 2:
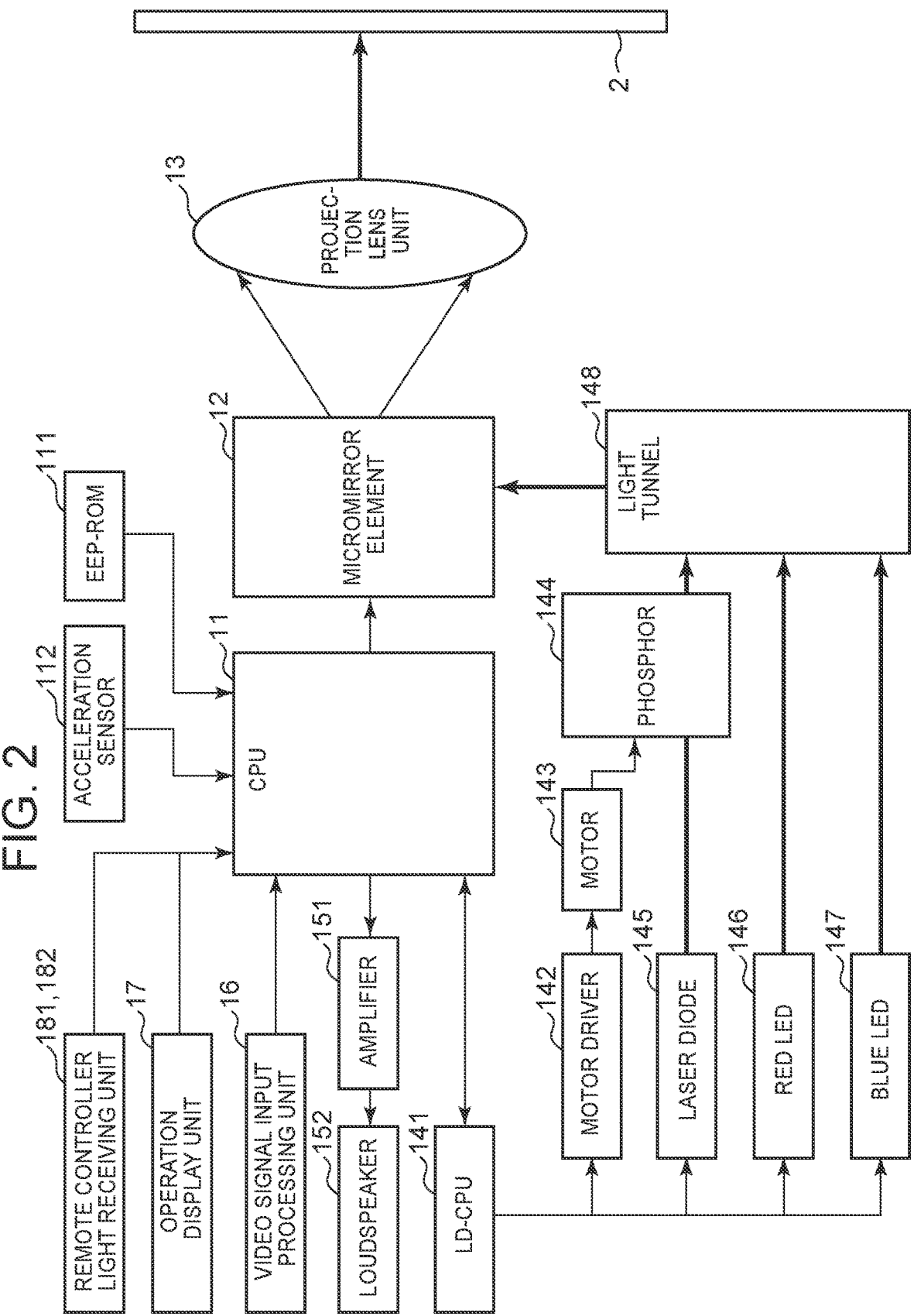
FIG. 2 is a schematic block diagram illustrating one example of the projector.

FIG. 2 is a schematic block diagram illustrating one example of the projector 1.

The projector 1 includes a CPU (Central Processing Unit) 111, an acceleration sensor 112, a micromirror element 12, an EEP-ROM (Electrically Erasable Programmable Read-Only Memory) 111, the projection lens unit 13, a video signal input processing unit (a front-end) 16. The projector 1 further includes an LD-CPU (Laser Diode Central Processing Unit) 141, a motor driver 142, a motor 143, a phosphor 144, a laser diode 145, a red LED (Light Emitting Diode) 146, a blue LED 147 and a light tunnel 148.

The CPU 11 configures a main CPU of the projector 1. The acceleration sensor 112, the EEP-ROM 111, the LD-CPU 141, an amplifier 151, the video signal input processing unit 16, the operation display unit 17 and remote controller light receiving units 181, 182 are connected to the CPU 11. The CPU 11 functions as a control unit and saves a detection value (an inclination) which is detected by the acceleration sensor 112 at the first start-up time which comes after completion of installation of the housing of the projector 1 on a predetermined surface into the EEP-ROM 111 as a saved value. In a case where a difference between the saved value and a current detection value which is detected by the acceleration sensor 112 becomes more than a predetermined threshold value (a first threshold value), the CPU 11 controls to give a warning at a predetermined timing. In a case where the difference between the saved value and the current detection value which is detected by the acceleration sensor 112 becomes more than a predetermined threshold value (a second threshold value), the CPU 11 controls to give the warning or to stop functions of the projector 1.

The EEP-ROM 111 functions as a storage unit which saves the detection value which is detected by the acceleration sensor 112 at the first start-up time which comes after completion of installation of the housing of the projector 1 on the predetermined installation surface.

The CPU 11 also functions as a scaler which displays and drives the micromirror element 12 which is a display element by higher-speed time division driving that a frame rate which follows a predetermined format, that is, for example, in a case where a frame rate of image data which is input into the projector 1 is 60 [frames/sec.], a frame rate of 120 [frames/sec.] which is two times the frame rate of the input image data, the number of divisions of a color component and the number of gradations to be displayed are multiplied together in accordance with the image data which is sent from the video signal input processing unit 16.

The micromirror element 12 is also called a Digital Micromirror Device and performs a displaying operation by performing an on/off operation on micromirrors which correspond to a plurality of pixels in number, for example, 1280 horizontal pixels×800 vertical pixels which are arranged in an array at a high speed so as to adjust inclination angles of the micromirrors respectively and thereby forms a light image with light which is reflected from the micromirrors. The micromirror element 12 is of an on/off two-step control type. However, it is possible for the micromirror element 12 to express gradations by a PWM (Pulse Width Modulation) system of performing the on/off operation at the high speed and thereby expressing tint of colors in an on-time ratio (width, density).

The amplifier 151 is connected to a loudspeaker 152. The CPU 11 converts voice data which is sent from the video signal input processing unit 16 into an analog voice and outputs the analog voice to the amplifier 151. The amplifier 151 amplifies the analog voice and drives the loudspeaker 152. Thereby, it becomes possible for the projector 1 to separate the voice data from moving image data which is input from the outside and to reproduce the separated voice data over the loudspeaker 152.

The LD-CPU 141 is a dedicated CPU which is used to control a light source. The LD-CPU 141 operates the motor driver 142 so as rotate the motor 143 and then to rotate the phosphor 144 which is fixed to a rotary shaft of the motor 143. The LD-CPU 141 drives the red LED 146 in time division so as to emit red light, drives the blue LED 147 in time division so as to emit blue light and drives the laser diode 145 so as to emit blue laser light. The light which is emitted from the laser diode 145 is excited by the phosphor 144 and thereby turns to green light. Three streaks of light of primary colors R/G/B are input into the light tunnel 148 in time division and are reflected from the micromirror element 12 and thereby the light image is formed. The light image which is formed in this way is projected on the screen 2 through the projection lens 13.

In a case where an image (projection screen data) to be projected is input from a video input terminal, the video signal input processing unit 16 inputs a video signal of the image into the CPU 11. At this time, the CPU 11 performs keystone correction on the input video signal in order to project the input video signal in the form of a rectangle regardless of an inclination of the projector 1. The CPU 11 deforms the image to be projected on the screen 2 on the basis of inclination information on the projector 1 which is detected by the acceleration sensor 112 and sends the image which is deformed in this way to the micromirror element 12. The micromirror element 12 forms the light image on the basis of the deformed image and projects the light image on the screen 2.

Incidentally, at the time of making initial settings, the CPU 11 stores a value that the acceleration sensor 112 detects or a value which is manually adjusted into the EEP-ROM 111.

Figure 3:
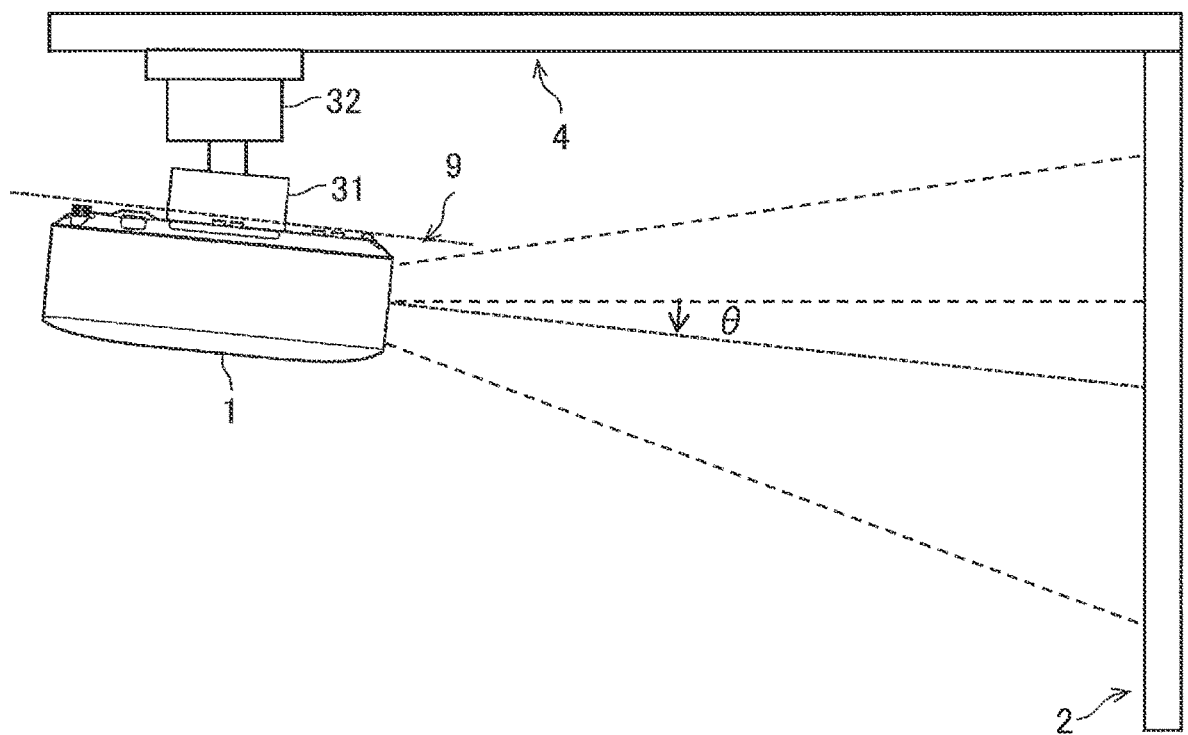
FIG. 3 is a diagram illustrating one example of a projecting operation of the projector which is in a ceiling-suspended state.

FIG. 3 is a diagram illustrating one example of a projecting operation of the projector 1 which is in a ceiling-suspended state.

The ceiling suspension metal fitting 32 which is an installation member is fixed to a ceiling 4 and the plate 31 and the projector 1 which is turned upside down are fixed to a lower part of the ceiling suspension metal fitting 32. The projector 1 is installed on a predetermined installation surface 9 with the aid of the ceiling suspension metal fitting 32 and the plate 31.

The projector 1 turns the image (the projection screen data) which is input into the projector 1 from the video signal input terminal and is to be projected on the screen 2 upside down. Further, the projector 1 detects a current front-back direction inclination θ of the housing by the acceleration sensor 112, performs keystone correction which depends on the inclination θ on the image (the projection screen data) to be projected on the screen 2 and outputs the image which is corrected in this way to the micromirror element 12. The micromirror element 12 forms the light image on the basis of the image which is corrected in this way and projects the light image on the screen 2. Incidentally, the acceleration sensor 112 in the present embodiment is capable of detecting inclinations of three axes in X, Y and Z directions.

Figure 4:
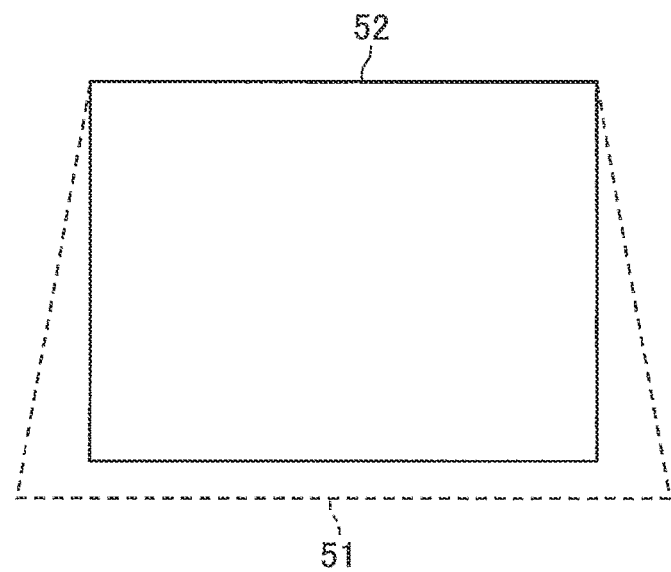
FIG. 4 is a diagram illustrating one example of a keystone correction operation which is performed on a projection screen by the projector.

FIG. 4 is a diagram illustrating one example of a keystone correction operation to be performed on a projection screen 51 by the projector 1.

A frame which is indicated by a broken line is the projection screen 51 that the projector 1 which is illustrated in FIG. 3 projects on the screen 2 with no keystone correction and which is obtained before the keystone correction is performed. The projector 1 is installed in a state of facing diagonally downward toward the screen 2. In this case, the projection screen 51 is projected in the form of a keystone that a lower side is longer than an upper side.

A frame which is indicated by a solid line is a projection screen 52 that the projector 1 which is illustrated in FIG. 3 projects on the screen 2 by performing the keystone correction thereon and which is obtained after the keystone correction is performed. The CPU 11 of the projector 1 corrects the image (the projection screen data) which is input from the video signal input terminal and is to be projected on the screen 2 into the form of a keystone that an upper side is longer than a lower side and sends the image to the micromirror element 12. Thereby, it follows that the projection screen 52 which is obtained after the keystone correction is performed in this way is projected on the screen 2 in the form of an almost rectangular shape.

Incidentally, a keystone correction function of the projector 1 is also used to correct a left-right inclination, not limited to correction of the front-back inclination of the projector 1.

Figure 5:
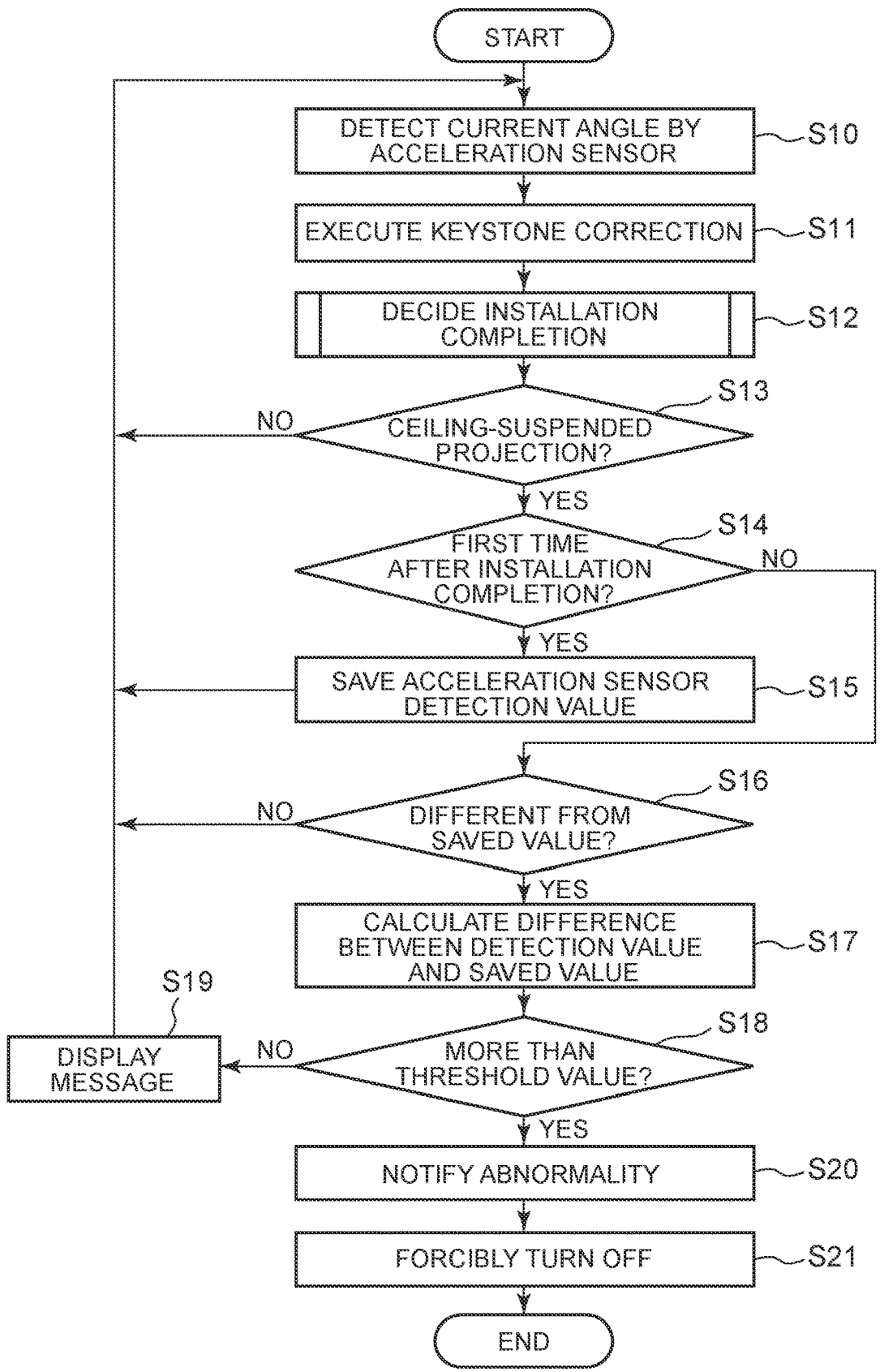
FIG. 5 is a flowchart illustrating one example of housing deterioration detection processing.

FIG. 5 is a flowchart illustrating one example of processing of detecting deterioration of the housing. In the following, the processing will be described with reference to FIG. 6 appropriately. The vertical axis of a graph in FIG. 6 indicates the difference between the current detection value which is detected by the acceleration sensor 112 and the saved value which is detected by the acceleration sensor 112 at the first start-up time which comes after completion of installation of the projector 1 and is saved in the EPP-ROM 111. The horizontal axis of the graph in FIG. 6 indicates an elapsed time. A solid line on the graph in FIG. 6 indicates a difference which is actually calculated by turning a power source of the projector 1 on. A broken line indicates a difference which is assumed from the inclination of the housing.

After completion of installation of the projector 1, a user inserts an AC power source plug into the projector 1. Then, execution of the processing in FIG. 5 is started every time that the user turns the power source of the projector 1 on.

The CPU 11 of the projector 1 detects a current installation angle by the acceleration sensor 112 (S10), then performs the keystone correction on the image (S11) and projects image data on the screen 2.

In step S12, the CPU 11 decides whether installation of the projector 1 is completed. Completion of installation means that installation of the projector 1 in a ceiling-suspended state, a wall-hung state and/or a board-stand integrated state is completed. The CPU 11 decides whether the installation of the projector 1 is completed on the basis of the detection value which is detected by the acceleration sensor 112 and a result of manual setting and reflects a result of decision in an installation completion flag. Processes for this decision will be described later with reference to FIG. 7 to FIG. 15.

Then, the CPU 11 decides whether projection is ceiling-suspended projection (S13). Here, the CPU 11 decides whether the projection is the ceiling-suspended projection on the basis of the installation angle that the acceleration sensor 112 detects. In a case where the projector 1 is installed in the ceiling-suspended state as illustrated in FIG. 1, since the projector 1 is turned upside down, it becomes possible to detect that the projector 2 is installed for the ceiling-suspended projection by the acceleration sensor 112.

In step S13, in a case where the projection is not the ceiling-suspended projection (No), the CPU 111 returns to the process in step S10. In a case where the projection is the ceiling-suspended projection (Yes), the CPU 111 proceeds to a process in step S14.

In step S14, the CPU 111 decides whether the present start-up of the projector 1 is the first start-up which is executed after completion of installation of the projector 1 in accordance with a change (on/off) of the installation completion flag. In a case where the present start-up is the first start-up which is executed after completion of installation of the projector 1 (Yes), the CPU 11 saves the detection value which is detected by the acceleration sensor 112 into the EEP-ROM 111 (step S15) and returns to the process in step S10. It is desirable to save the detection value which is detected by the acceleration sensor 112 into the EEP-ROM 111 after low-pass filtering is performed on the detection value for, for example, several seconds to several tens of seconds. A time T0 in FIG. 6 corresponds to the first start-up time.

In a case where the present start-up is not the first stat-up which is executed after the installation of the projector 1 is completed (No), the CPU 11 proceeds to step S16 and decides whether the detection value which is detected by the acceleration sensor 112 is different from the saved value in the EEP-ROM 111. That is, the CPU 11 functions as an acquisition unit which acquires the difference between the early-stage detection value which is detected by the acceleration sensor 112 which is installed in the housing of the projector 1 and detects the inclination of the housing of the projector 1 at the first start-up time which comes after the housing is installed on the predetermined installation surface and the current detection value which is detected by the acceleration sensor 112. In the ceiling-suspended projection state, the CPU 11 compares each detection value which is detected by the acceleration sensor 112 with the saved value in the EEP-ROM 111 at predetermined time intervals. It is desirable to compare the detection value which is detected by the acceleration sensor 112 with the saved value in the EEP-ROM 111 after performing the low-pass filtering on the detection value for, for example, several seconds to several tens of seconds for the purpose of avoiding erroneous detection caused by vibrations which are induced by an earthquake and so forth.

In step S16, in a case where the detection value which is detected by the acceleration sensor 112 and the saved value in the EEP-ROM 111 are not different from each other (No) and no change is found in the detection value, the CPU 11 returns to the process in step S10. Specifically speaking, a timing that no change is found in the detection value and the CPU 11 returns to the process of step S10 corresponds to a time T1 in FIG. 6. In a case where the difference between the detection value which is detected by the acceleration sensor 112 and the saved value in the EEP-ROM 111 is less than Δ1 (a first threshold vale) in FIG. 6, the CPU 11 decides that the detection value which is detected by the acceleration sensor 112 and the saved value in the EEP-ROM 111 are not different from each other.

Figure 6:
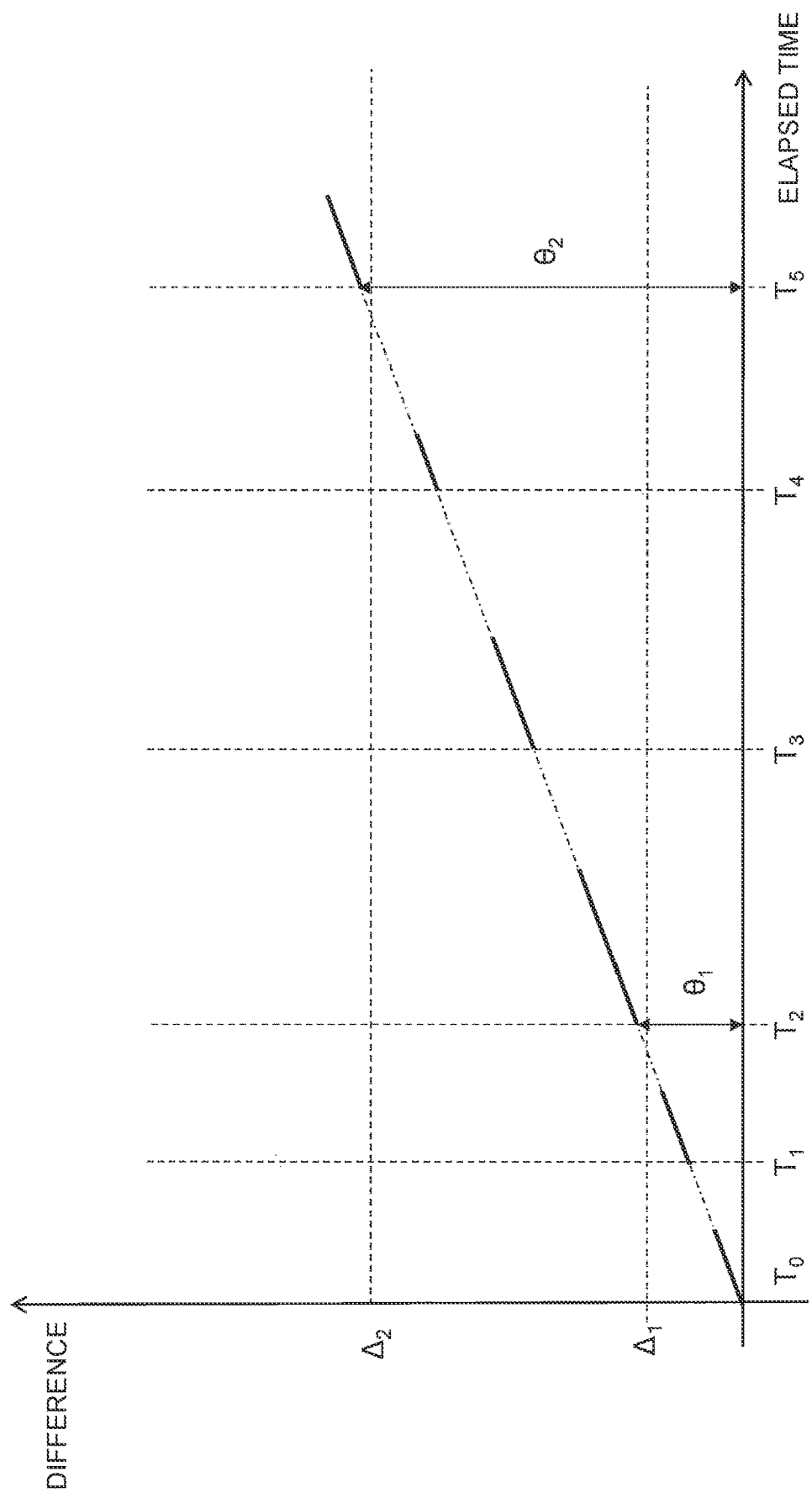
FIG. 6 is a graph illustrating one example of a difference between a saved value and a detection value which is detected by an acceleration sensor and an elapsed time.

The time T1 in FIG. 6 is the timing that the difference between the detection value and the saved value reaches the first threshold value and thereafter the power source is turned on next. However, in a case where the difference between the detection value and the saved value reaches the first threshold value while the projector 1 is being operated, the CPU 11 may give the warning at any time, not limited to the time T1.

In a case where the detection value which is detected by the acceleration sensor 112 and the saved value in the EEP-ROM 111 are different from each other (Yes), the CPU 11 calculates the difference between the detection value which is detected by the acceleration sensor 112 and the saved value in the EEP-ROM 111 (S17). The CPU 11 proceeds to a process in step S17 after a time T2 that the difference between the detection value which is detected by the acceleration sensor 112 and the saved value in the EEP-ROM 111 reaches Δ1 (corresponding to the inclination angle θ1).

Figure 20:
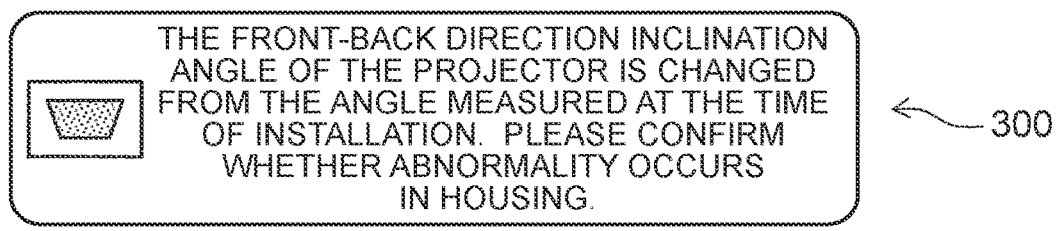
FIG. 20 is a diagram illustrating one example of an attention calling message in the projector according to the present embodiment.

In step S18, the CPU 11 decides whether the difference between the detection value and the saved value is more than another threshold value. In a case where the difference between the detection value and the saved value is less than another threshold value (No), the CPU 11 displays a warning message for a predetermined time period (S19) so as to notify the user of occurrence of abnormality and then returns to the process in step S10. For example, the projector 1 projects and displays an attention calling message such as that illustrated in FIG. 20. Specifically speaking, another threshold value corresponds to Δ2 (a second threshold value) in FIG. 6. A time period for which the difference between the detection value and the saved value is less than the threshold value Δ2 corresponds to a time period between times T2 and T4 in FIG. 6.

In a case where the difference between the detection value and the saved value is more than the second threshold value Δ2 (Yes), the CPU 11 proceeds to a process in step S20 and notifies the user of the occurrence of abnormality. Specifically speaking, a timing that the occurrence of abnormality is notified corresponds to a time T5 in FIG. 6. At the time T5, the inclination angle reaches θ2 and the difference between the detection value and the saved value is more than the threshold value Δ2. The CPU 11 notifies the user of the occurrence of abnormality in the form of, for example, a notification which is given by projecting and displaying a warning message on the screen 2, a notification which is given by displaying keystone correction which is performed on the basis of the saved value, a notification which is sent to devices of an administrator and the user via communications, a notification which is given by flickering LEDs of the operation display unit 17, a voice notification using voices and so forth. In the keystone correction which is performed on the basis of the saved value, a projection screen on which the keystone correction is performed at the time of installation of the projector 1 is displayed and thereby it becomes possible to notify the user of a situation where the current installation surface is inclined in comparison with the installation surface at the time of installation of the projector 1. Incidentally, the CPU 11 may use any optional communication path such as RS232C, RJ45 and so forth in a case of notifying the devices of the administrator and the user of the situation.

Then, the CPU 11 forcibly turns the power source of the projector 1 off (S21) and terminates execution of the processing in FIG. 5. As an alternative, the CPU 11 forcibly stops light emission from the light source of the projector 1 and turns the light source off. That is, the CPU 11 forcibly stops the operation of the projector 1.

The time T5 in FIG. 6 is the timing that the difference between the detection value and the saved value reaches the second threshold value and then the power source of the projector 1 is turned on next. However, in a case where the difference between the detection value and the saved value reaches the second threshold value while the projector 1 is being operated, the CPU 11 may stop the operation of the projector 1 at any time not limited to the time T5.

According to the present embodiment, the CPU 11 functions as an acquisition unit which acquires the difference between the early-stage detection value (the saved value) which is detected by the acceleration sensor 112 which is installed in the housing of the projector 1 and detects the inclination of the housing at the first start-up time which comes after the installation of the housing of the projector 1 on the predetermined installation surface and the current detection value which is detected by the acceleration sensor 112 and as the control unit which controls to give the warning at the predetermined timing or to stop the functions of the projector 1 in a case where the difference between the detection value and the saved value which is acquired by the acquisition unit exceeds the predetermined threshold value. Accordingly, it becomes possible to monitor a change of setting of the projector 1 from the time that use of the projector 1 is started, to detect the deterioration of the housing and the cracks in the housing of the projector 1, to give the warning to the user and thereby to encourage the user to stop the use of the projector 1. Accordingly, since it becomes possible to detect a sign of initial deterioration of the resinous housing of the projector 1 at an early stage, it becomes possible to avoid deterioration of the entire resinous housing of the projector 1. Incidentally, the predetermined timing is a time which comes immediately after the difference between the detection value and the saved value reaches the predetermined threshold value or a time that the power source is turned on next.

Figure 7:
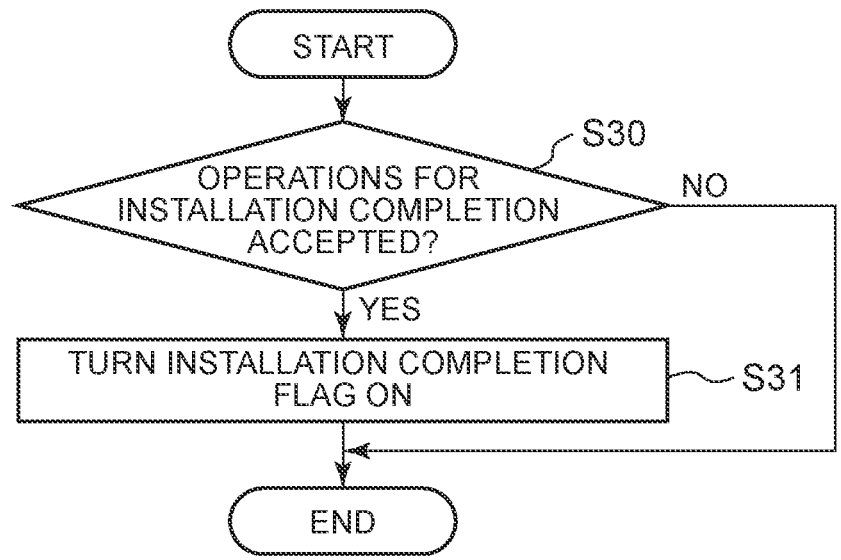
FIG. 7 is a flowchart illustrating one example of a process (a first process) of detecting completion of installation.

FIG. 7 is a flowchart illustrating one example of a process of detecting completion of installation (a first process). This process is a subroutine which is called in step S12 in FIG. 6.

In step S30, the CPU 11 decides whether operations for completion of installation which are performed by menu selection and command issuance are accepted. Here, the operations for completion of installation include some or all of, for example, a keystone correction angle setting, a ceiling-suspended projection setting, a rear projection setting, a digital screen shift setting, a zoom setting, a focus setting and an installation environment setting.

Figure 17:
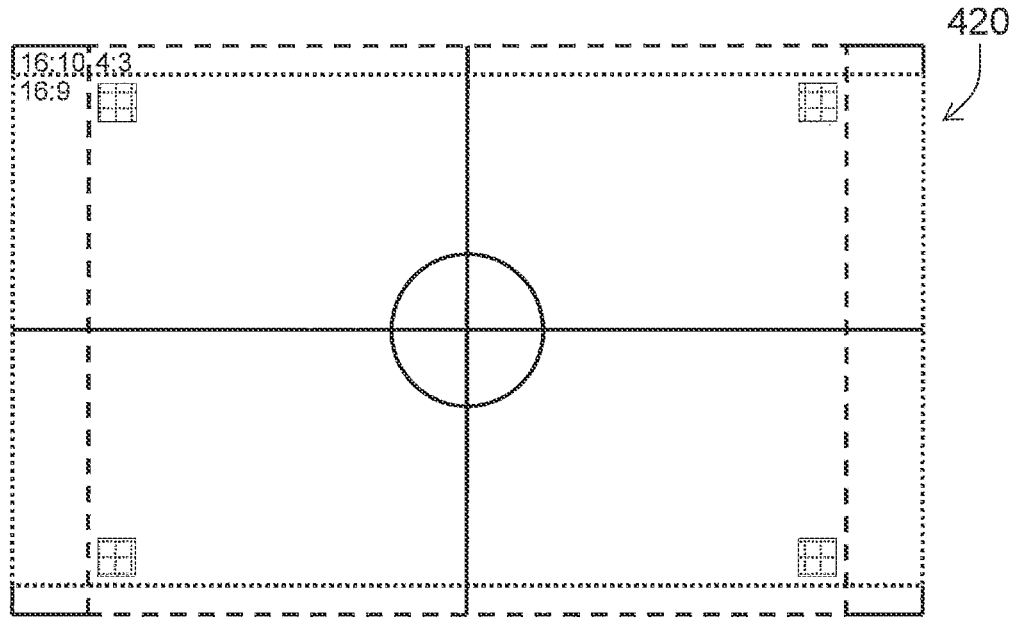
FIG. 17 is a diagram illustrating one example of a projection screen of a built-in pattern for installation in the projector according to the present embodiment.
Figure 18A:
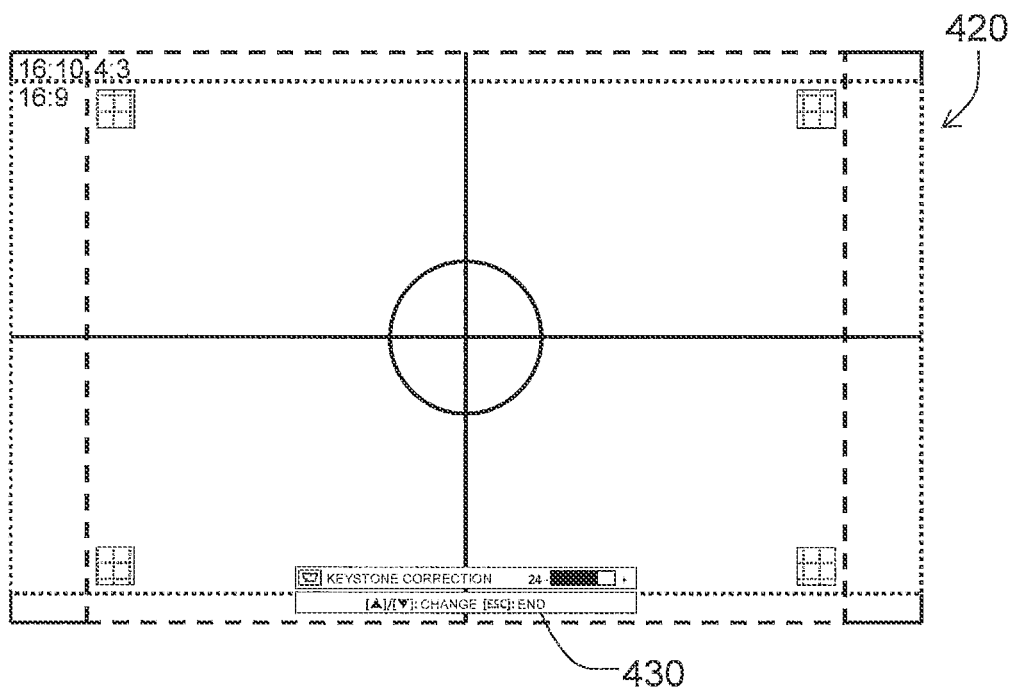
FIG. 18A is a diagram illustrating one example of the built-in pattern for installation which includes a dialog for keystone correction in the projector according to the present embodiment.
Figure 18B:
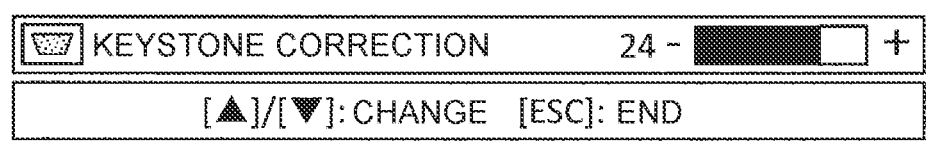
FIG. 18B is a diagram illustrating one example of the dialogue for the keystone correction in the projector according to the present embodiment.

FIG. 18A and FIG. 18B illustrate examples of a keystone correction angle setting screen. After projection of a built-in pattern for installation 420 which is illustrated in FIG. 17 is performed, a keystone correction angle setting is made. FIG. 18B is an enlarged diagram of a keystone correction dialogue 430 in FIG. 18A. An installer adjusts an angle for keystone correction by regulating a lateral bar in a + direction or a − direction. Specifically, the installer corrects a longitudinal-direction keystone distortion by pushing an up-down cursor key on a projector main body. In addition, the installer corrects the longitudinal-direction keystone distortion by pushing a [KEYSTONE +] key or a [KEYSTONE −] key (not illustrated) of the remote controller. Then, the installer closes the keystone correction dialog 430 by pushing the [ESC] key. Then, the installer accepts the power-off and then turns the installation completion flag on.

Figure 19A:
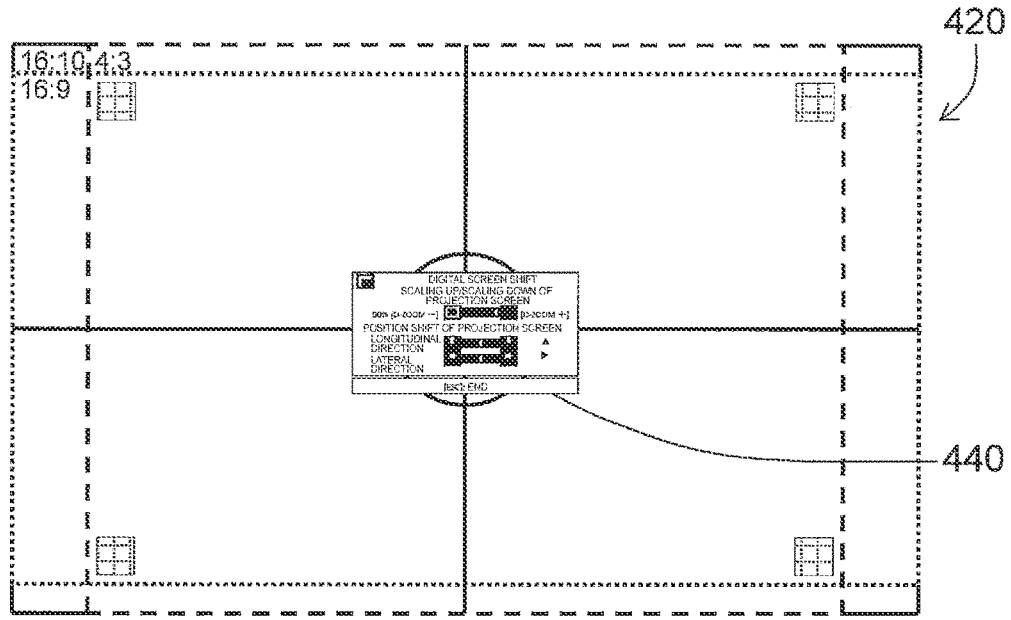
FIG. 19A is a diagram illustrating one example of the built-in pattern for installation which includes a "Digital Screen Shift" dialogue in the projector according to the present embodiment.
Figure 19B:
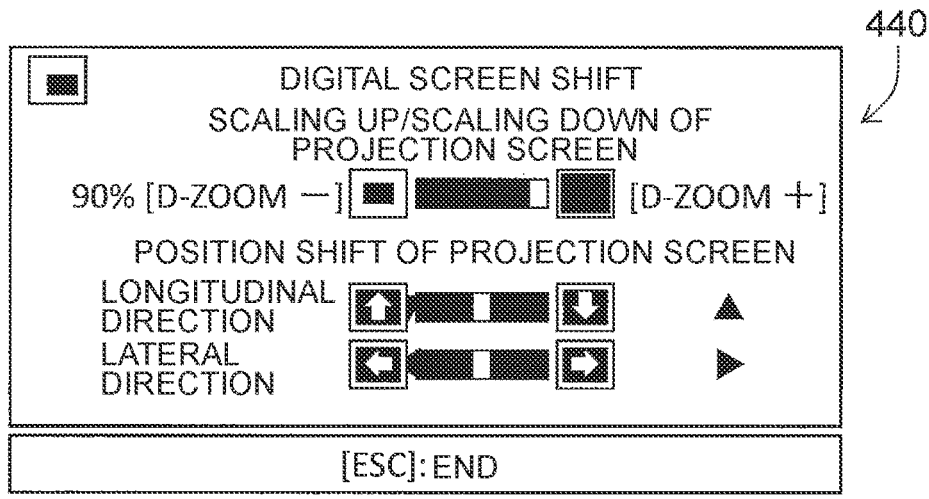
FIG. 19B is a diagram illustrating one example of the "Digital Screen Shift" dialogue in the projector according to the present embodiment.

FIG. 19A and FIG. 19B illustrate examples of a digital screen shift setting screen. FIG. 19B is an enlarged diagram of a "Digital Screen Shift" dialogue 440 in FIG. 19A. The digital screen shift is a function of scaling the projection screen down in length-to-width equal ratio and shifting a projection position upward, downward, leftward and rightward. The digital screen shift is useful in a case where it is wished to adjust a projection size and the projection position with the projector 1 being fixed.

The installer projects the built-in pattern for installation 420 in FIG. 17 on the screen 2 and then makes the digital screen shift setting. The installer pushes a [MENU] key of the display operation unit 17 or the remote controller so as to display a setting menu 410 (see FIG. 16). Then, the installer selects the items in order of "Screen Setting"→"Digital Screen Shift"→"Change of Digital Screen Shift" and then pushes an [ENTER] key. Then, the "Digital Screen Shift" dialogue 440 which is illustrated in FIG. 19A and FIG. 19B is displayed. Then, the installer adjusts the size of the projection screen to a value which is less than 100% by using a [D-ZOOM −] key and a [D-ZOOM +] key. In a case where the size of the projection screen is changed to a value which is less than 100%, position shifting of the projection screen becomes possible. In a case where it is wished to shift the position of the projection screen, the installer adjusts the position by pushing the up-down cursor key for shifting the position of the projection screen in the longitudinal direction. In addition, the installer adjusts the position of the projection screen by pushing a left-right cursor key for shifting the position of the projection screen in the lateral direction. In a case where adjustment of position shifting of the projection screen is terminated or in a case where the size of the projection screen is 100% and therefore the position shifting of the projection screen is not performed, the installer closes the "Digital Screen Shift" dialogue 440 by pushing the [ESC] key and then closes the setting menu 410 (see FIG. 16) by pushing the [MENU] key. Thereafter, the CPU 11 accepts the power-off and then turns the installation completion flag on.

In a case where the CPU 11 accepts the operations for installation completion (Yes), the CPU 11 turns the installation completion flag on (S31) and terminates execution of the process in FIG. 7. In a case where the CPU 11 does not accept the operations for installation completion (No), the CPU 11 terminates execution of the process in FIG. 7.

That is, in a case where the CPU 11 accepts the operations for installation completion, the CPU 11 decides that installation of the housing of the projector 1 on the predetermined installation surface is completed.

Figure 8:
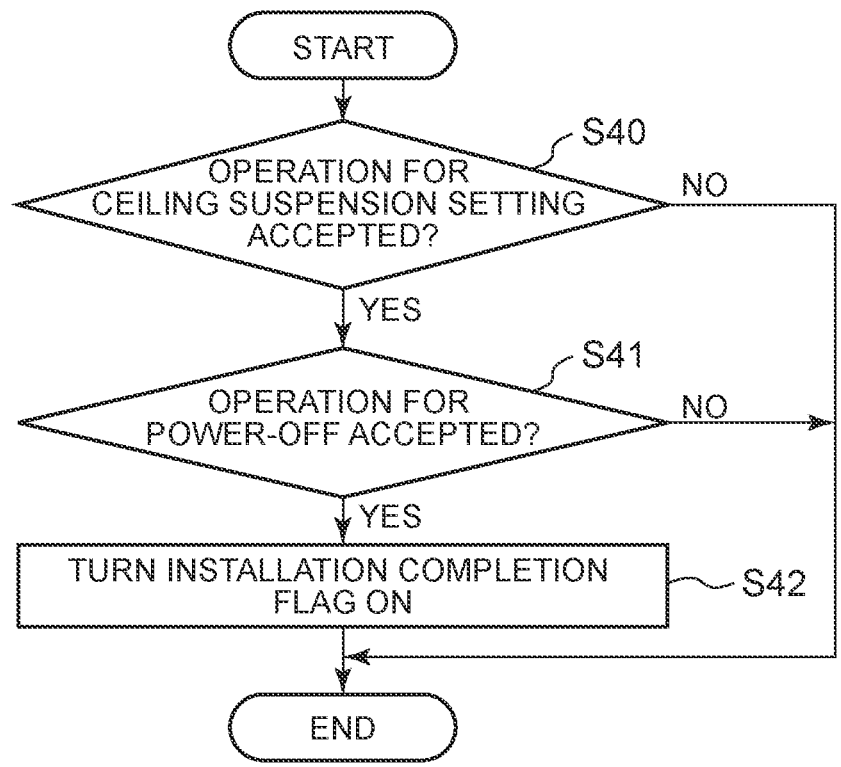
FIG. 8 is a flowchart illustrating one example of a process (a second process) of detecting completion of installation.

FIG. 8 is a flowchart illustrating one example of a process of detecting completion of installation (a second process). This process is a subroutine which is called in step S12 in FIG. 6.

In step S40, the CPU 11 decides whether an operation for a ceiling suspension setting which is performed by menu selection and command issuance is accepted.

Figure 16:
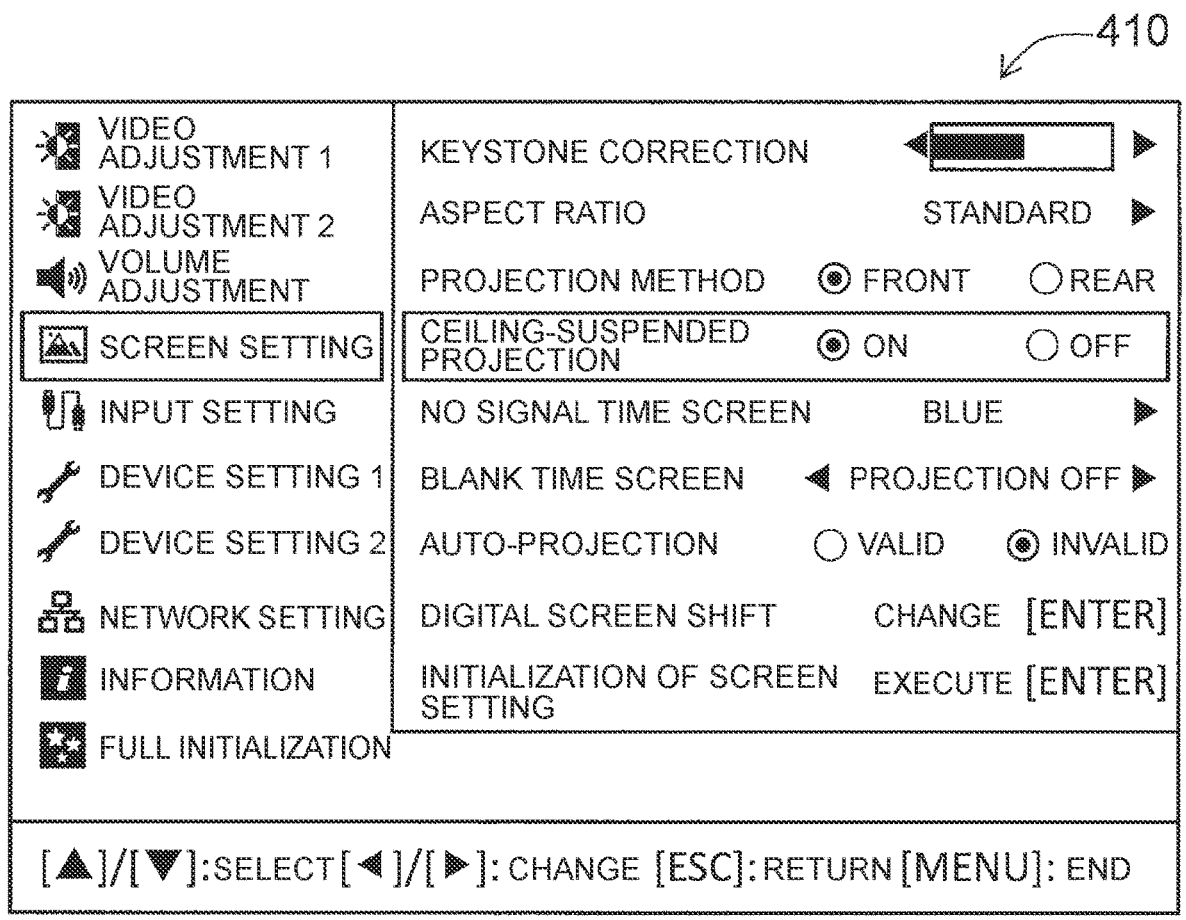
FIG. 16 is a diagram illustrating one example of a setting menu which includes a ceiling-suspended projection setting screen in the projector according to one embodiment of the present invention.

FIG. 16 illustrates one example of a setting menu 410 which includes a ceiling-suspended projection setting screen. In a case of the ceiling-suspended projection setting screen such as that illustrated in FIG. 16, after a setting for ceiling-suspended projection is made by selecting "Screen Setting" from menu items and then selecting "On" in "Ceiling-Suspended Projection", the installer closes a dialogue in the setting menu 410 by pushing the [ESC] key and then closes the setting menu 410 by pushing the [MENU] key. Thereafter, in a case where the CPU 11 accepts the power-off, it becomes possible for the CPU 11 to turn the installation completion flag on. In a case where the CPU 11 does not accept the operation for the ceiling-suspended projection setting, the CPU 11 terminates execution of the process in FIG. 8.

In a case where the CPU accepts the operation for the ceiling-suspended projection setting (Yes), the CPU 11 decides whether an operation for the power-off is accepted after acceptance of the operation for the ceiling-suspended projection setting (S41). In step S41, in a case where the CPU 11 accepts the operation for the power-off (Yes), the CPU 11 turns the installation completion flag on (S42) and terminates execution of the process in FIG. 9. In a case where the CPU does not accept the operation for the power-off (No), the CPU 11 terminates execution of the process in FIG. 8.

That is, in a case where the CPU 11 accepts the first operation for the power-off which is performed after switching to the ceiling-suspended projection setting, the CPU 11 decides that installation of the housing of the projector 1 on the predetermined installation surface is completed.

There are cases where the operation for the ceiling-suspended projection setting is performed immediately after ceiling-suspended installation of the projector 1. At that time, there are cases where the projector 1 is not stable due to generation of the vibrations and so forth. On the other hand, in a case where the power source is turned off once and then is turned on again, it is expected that the installed state of the projector 1 is stable. For this reason, it becomes possible for the CPU 11 to favorably measure the state of the projector 1 at the time of completion of installation.

Figure 9:
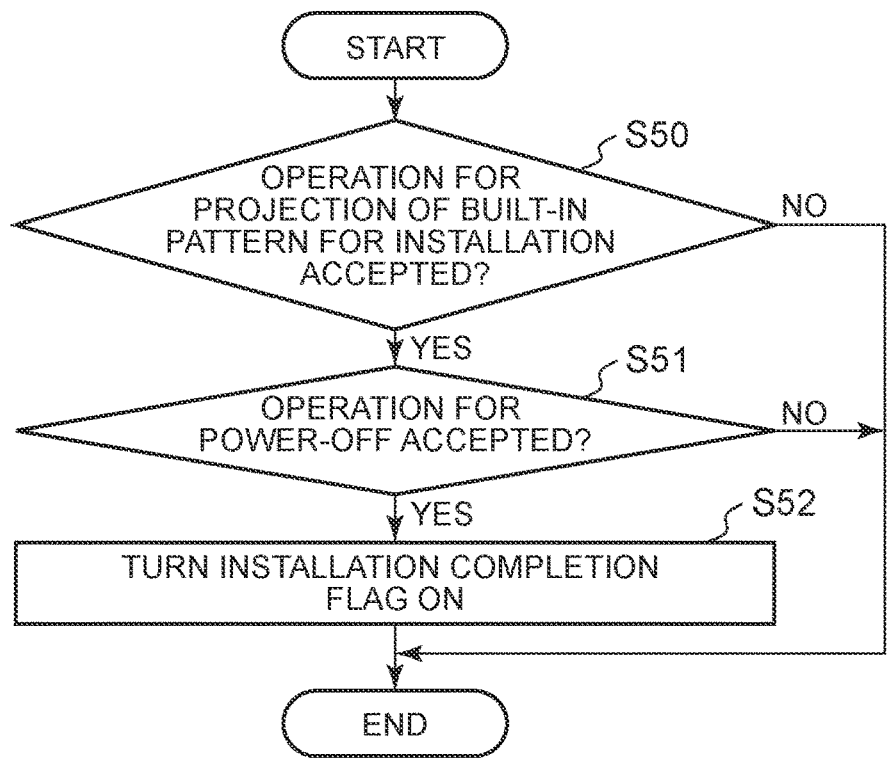
FIG. 9 is a flowchart illustrating one example of a process (a third process) of detecting completion of installation.

FIG. 9 is a flowchart illustrating one example of a process of defecting completion of installation (a third process). This process is a subroutine which is called in step S12 in FIG. 6.

In step S50, the CPU 11 decides whether an operation for projection of the built-in pattern for installation 420 which is performed by menu selection and command issuance is accepted.

FIG. 17 illustrates one example of a projection screen of the built-in pattern for installation 420. The installer of the projector 1 selects "Screen Setting" from the items of the setting menu 410 (see FIG. 16) and then selects "No Signal Time Screen". Next, the installer selects "Test Pattern" (not illustrated) which is the built-in pattern for installation 420 from "Blue", "Black", "Logo" and "Test Pattern" (not illustrated except "Blue") as the projection screen to be displayed in the absence of the input signal into the projector 1. In a case where the CPU 11 accepts the power-off after projection of the built-in pattern for installation 420 such as that illustrated in FIG. 17, it becomes possible for the CPU 11 to turn the installation completion flag on. In a case where the CPU 11 does not accept the operation for projection of the built-in pattern for installation 420, the CPU 11 terminates execution of the process in FIG. 9.

In a case where the CPU 11 accepts the operation for projection of the built-in pattern for installation 420 (Yes), the CPU 11 decides whether the operation for the power-off is accepted after acceptance of the operation for projection of the built-in pattern for installation 420 (S51). In step S51, in a case where the CPU 11 accepts the operation for the power-off (Yes), the CPU 11 turns the installation completion flag on (S52) and terminates execution of the process in FIG. 9. In a case where the CPU 11 does not accept the operation for the power-off (No), the CPU terminates execution of the process in FIG. 9.

That is, in a case where the CPU 11 accepts the operation for the power-off which is performed first after projection of the built-in pattern for installation 420 on the screen 2, the CPU 11 decides that installation of the housing of the projector 1 on the predetermined installation surface is completed.

There are cases where the operation for projection of the built-in pattern for installation 420 is performed immediately after the projector 1 is installed in the ceiling-suspended state. At that time, there are cases where the projector 1 is not stable due to generation of the vibrations and so forth. On the other hand, in a case where the power source is turned off once and then is turned on again, it is expected that the installed state of the projector 1 is stable. Therefore, it becomes possible for the CPU 11 to favorably measure the state of the projector 1 at the time of completion of installation.

Figure 10:
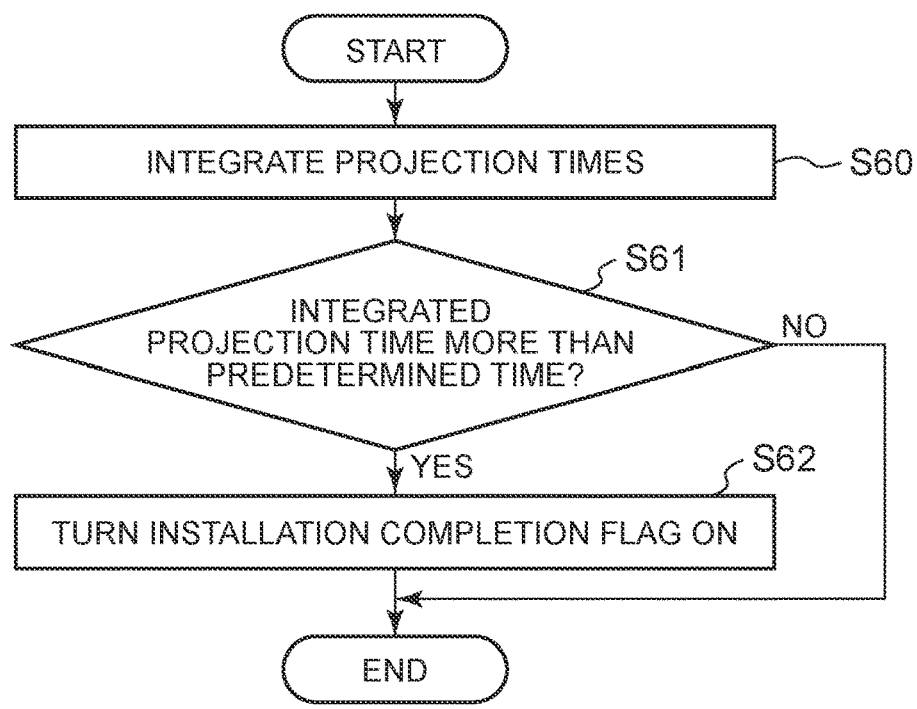
FIG. 10 is a flowchart illustrating one example of a process (a fourth process) of detecting completion of installation.

FIG. 10 is a flowchart illustrating one example of a process of defecting completion of installation (a fourth process). This process is a subroutine which is called in step S12 in FIG. 6.

In step S60, the CPU 11 integrates projection times.

In step S61, the CPU 11 decides whether the integrated projection time is more than a predetermined time.

In a case where the integrated projection time is more than the predetermined time (Yes), the CPU 11 turns the installation completion flag on (S62) and terminates execution of the process in FIG. 10. In a case where the integrated projection time is less than the predetermined time (No), the CPU 11 terminates execution of the process in FIG. 10.

That is, in a case where the integrated projection time exceeds the predetermined time, the CPU 11 decides that installation of the housing of the projector 1 on the predetermined installation surface is completed.

The projector 1 is installed in the ceiling-suspended state mostly after factory shipment and therefore such a situation scarcely occurs that a used projector and so forth are installed in the ceiling-suspended state. Therefore, it is possible to regard a time that the integrated projection time exceeds the predetermined time as the time that installation of the projector 1 is completed.

Figure 11:
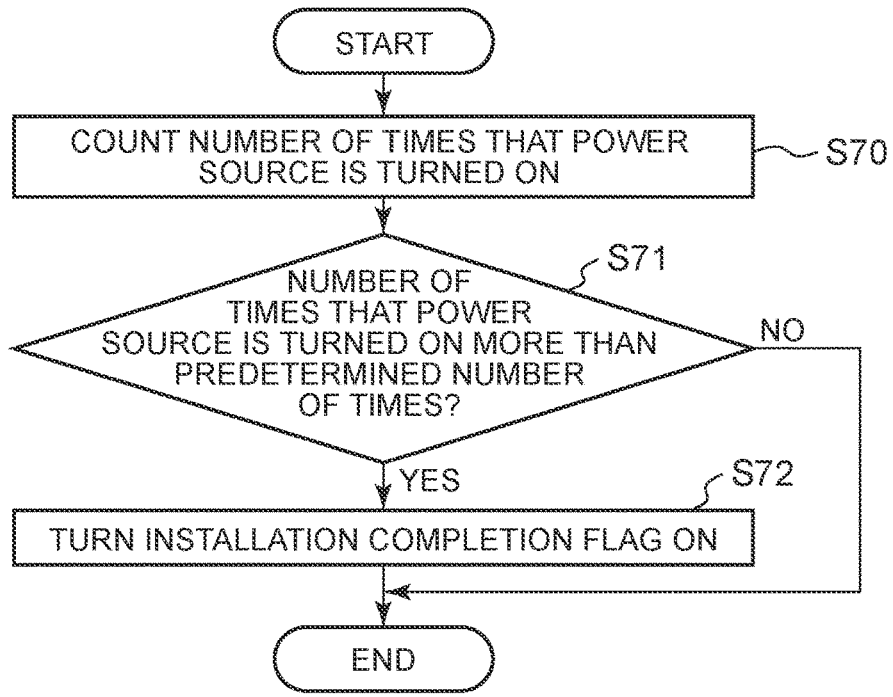
FIG. 11 is a flowchart illustrating one example of a process (a fifth process) of detecting completion of installation.

FIG. 11 is a flowchart illustrating one example of a process of detecting completion of installation (a fifth process). This process is a subroutine which is called in step S12 in FIG. 6.

In step S70, the CPU 11 counts the cumulative number of times that the power source is turned on.

In step S71, the CPU 11 decides whether the cumulative number of times that the power source is turned on is more than a predetermined number of times.

In step S71, in a case where the cumulative number of times that the power source is turned on is more than the predetermined number of times (Yes), the CPU turns the installation completion flag on (S72) and terminates execution of the process in FIG. 11. In a case where the cumulative number of times that the power source is turned on is less than the predetermined number of times (No), the CPU 11 terminates execution of the process in FIG. 11.

That is, in a case where the cumulative number of times that the power source is turned on exceeds the predetermined number of times, the CPU 11 decides that installation of the housing of the projector 1 on the predetermined installation surface is completed.

The projector 1 is installed in the ceiling-suspended state mostly after factory shipment and such a situation scarcely occurs that the used projector and so forth are installed in the ceiling-suspended state. Therefore, it is possible to regard a time that the cumulative number of times that the power source is turned on exceeds the predetermined number of times as the time that installation of the projector 1 is completed.

Figure 12:
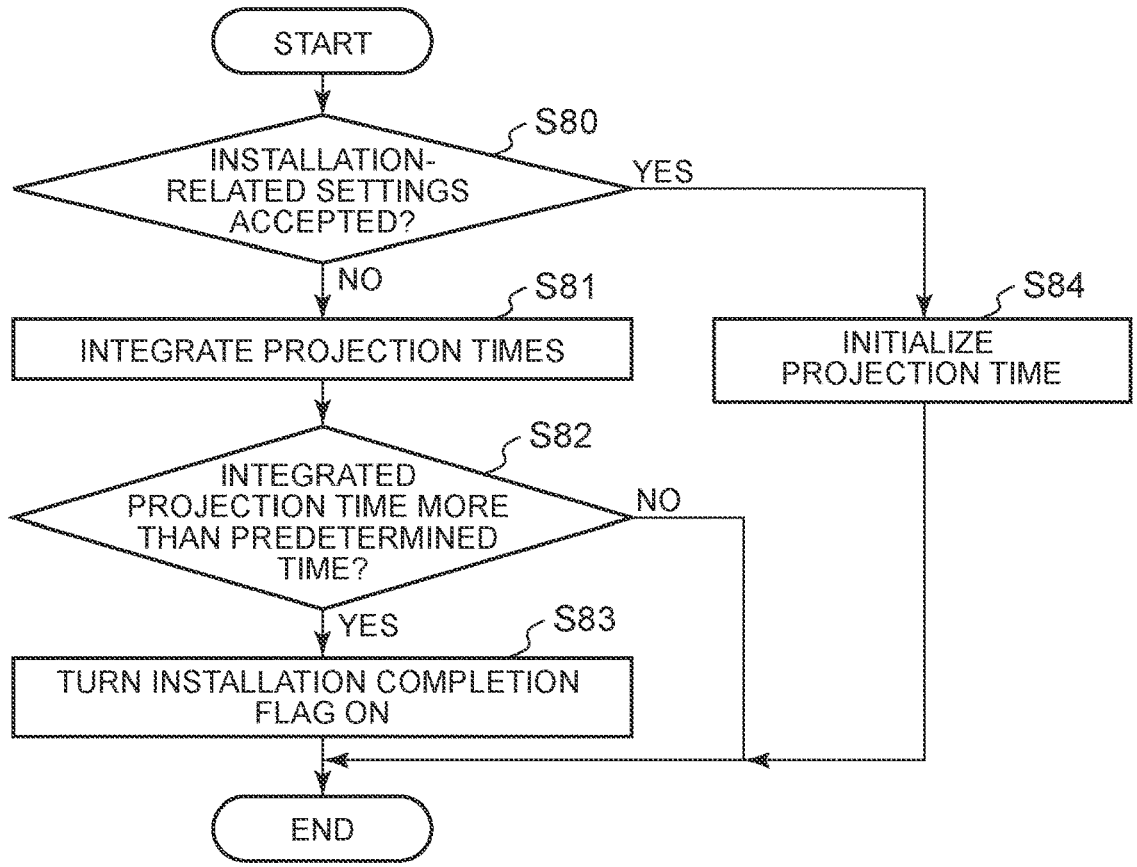
FIG. 12 is a flowchart illustrating one example of a process (a sixth process) of detecting completion of installation.

FIG. 12 is a flowchart illustrating one example of a process of detecting completion of installation (a sixth process). This process is a subroutine which is called in step S12 in FIG. 6.

In step S80, the CPU 11 decides whether installation-related settings which are made by menu selection and command issuance are accepted. Here, the installation-related settings include some or all of, for example, the keystone correction angle setting, the ceiling-suspended projection setting, the rear projection setting, the digital screen shift setting, the zoom setting, the focus setting and the installation environment setting. In a case where the installation-related settings are accepted (Yes), the CPU 11 initializes the projection time (S84) and terminates execution of the process in FIG. 12.

In a case where the installation-related settings are not accepted (No), the CPU 11 integrates the projection times (S81). In step S82, the CPU 11 decides whether the integrated projection time is more than the predetermined time.

In a case where the integrated projection time is more than the predetermined time (Yes), the CPU 11 turns the installation completion flag on (S83) and terminates execution of the process in FIG. 12. In a case where the integrated projection time is less than the predetermined time (No), the CPU 11 terminates execution of the process in FIG. 12.

That is, in a case where the integrated projection time which is obtained after acceptance of the installation-related settings exceeds the predetermined time, the CPU 11 decides that installation of the housing of the projector 1 on the predetermined installation surface is completed.

After ceiling-suspended installation of the projector 1, the user makes the installation-related settings. However, in a case where the installation completion flag is turned on depending on the installation-related settings, there is a fear that in a case where the user finely adjusts the installation angle and so forth after the installation completion flag is turned on, the finely adjusted installation angle and so forth may be erroneously decided as deterioration of the housing and cracks in the housing. Therefore, in a case where the integrated projection time exceeds the predetermined time after the installation-related settings are made, the CPU 11 decides that installation of the housing of the projector 1 on the predetermined installation surface is completed. Thereby, it becomes possible to avoid erroneous decision induced by fine adjustment which is made after installation of the projector 1 in the ceiling-suspended state.

Figure 13:
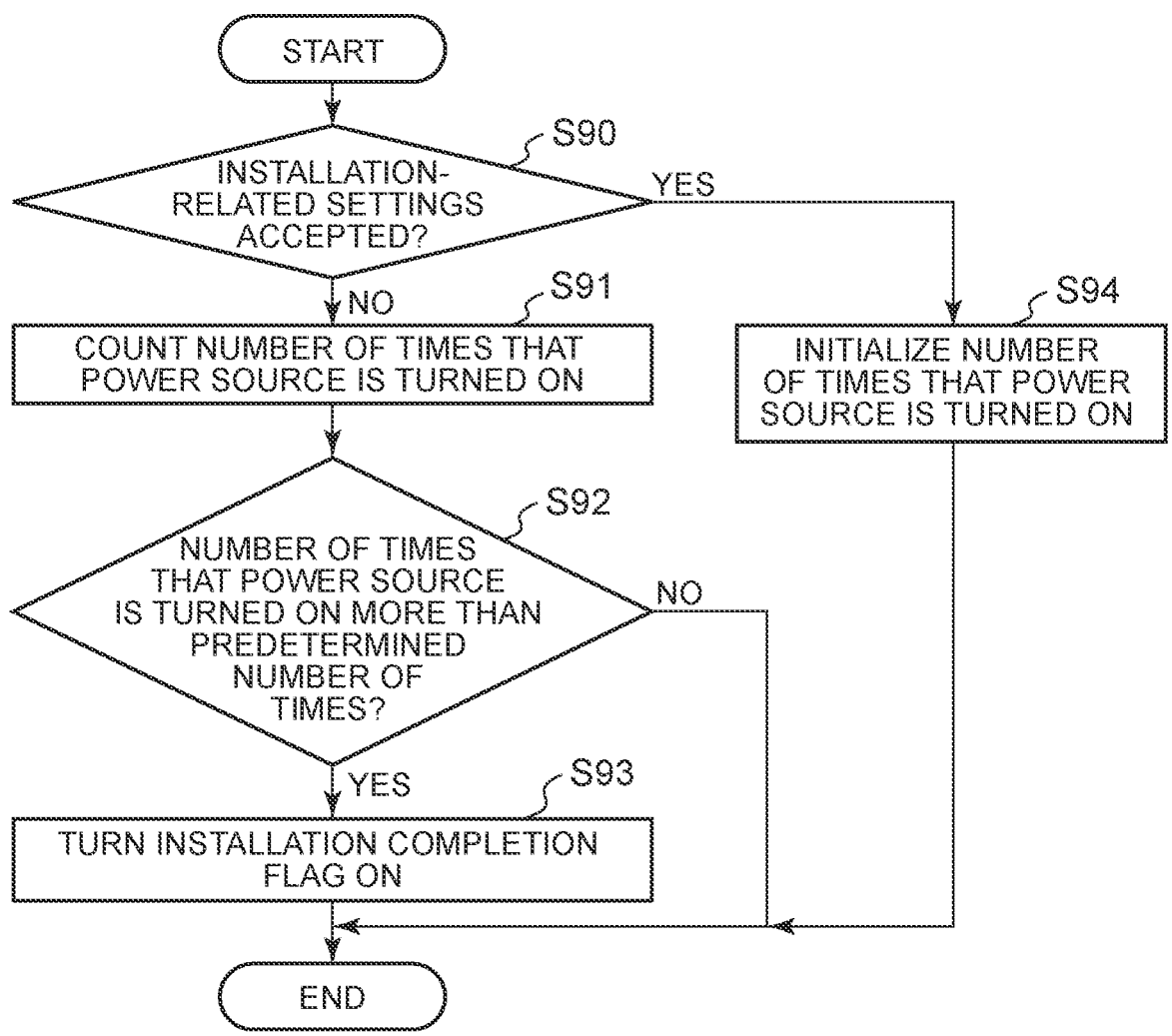
FIG. 13 is a flowchart illustrating one example of a process (a seventh process) of detecting completion of installation.

FIG. 13 is a flowchart illustrating one example of a process of detecting completion of installation (a seventh process). This process is a subroutine which is called in step 12 in FIG. 6.

In step S90, the CPU 11 decides whether the installation-related settings which are made by menu selection and command issuance are accepted. Here, the installation-related settings include some or all of, for example, the keystone correction angle setting, the ceiling-suspended projection setting, the rear projection setting, the digital screen shift setting, the zoom setting, the focus setting and the installation environment setting. In a case where the installation-related settings are accepted (Yes), the CPU 11 initializes the projection time (S94) and terminates execution of the process in FIG. 13.

In a case where the installation-related settings are not accepted (No), the CPU 11 counts the cumulative number of times that the power source is turned on (S91). In step S92, the CPU decides whether the counted cumulative number of times that the power source is turned on is more than the predetermined number of times.

In a case where the counted cumulative number of times that the power source is turned on is more than the predetermined number of times (Yes), the CPU 11 turns the installation completion flag on (S93) and terminates execution of the process in FIG. 13. In a case where the counted cumulative number of times that the power source is turned on is less than the predetermined number of times (No), the CPU 11 terminates execution of the process in FIG. 13.

That is, in a case where the number of times that the power source is turned on which is obtained after acceptance of the installation-related settings exceeds the predetermined number of times, the CPU 11 decides that installation of the housing of the projector 1 on the predetermined installation surface is completed.

The user makes the installation-related settings after the projector 1 is installed in the ceiling-suspended state. However, in a case where the installation completion flag is turned on depending on the installation-related settings, there is a fear that in a case where the user finely adjusts the installation angle and so forth after the installation completion flag is turned on, the finely adjusted installation angle and so forth may be erroneously decided as the deterioration of the housing and the cracks in the housing. Therefore, in a case where the cumulative number of times that the power source is turned on exceeds the predetermined number of times after the installation-related settings are made, the CPU 11 decides that installation of the housing of the projector 1 on the predetermined installation surface is completed. Thereby, it becomes possible to avoid the erroneous decision caused by the fine adjustment which is performed after installation of the projector 1 in the ceiling-suspended state.

Figure 14:
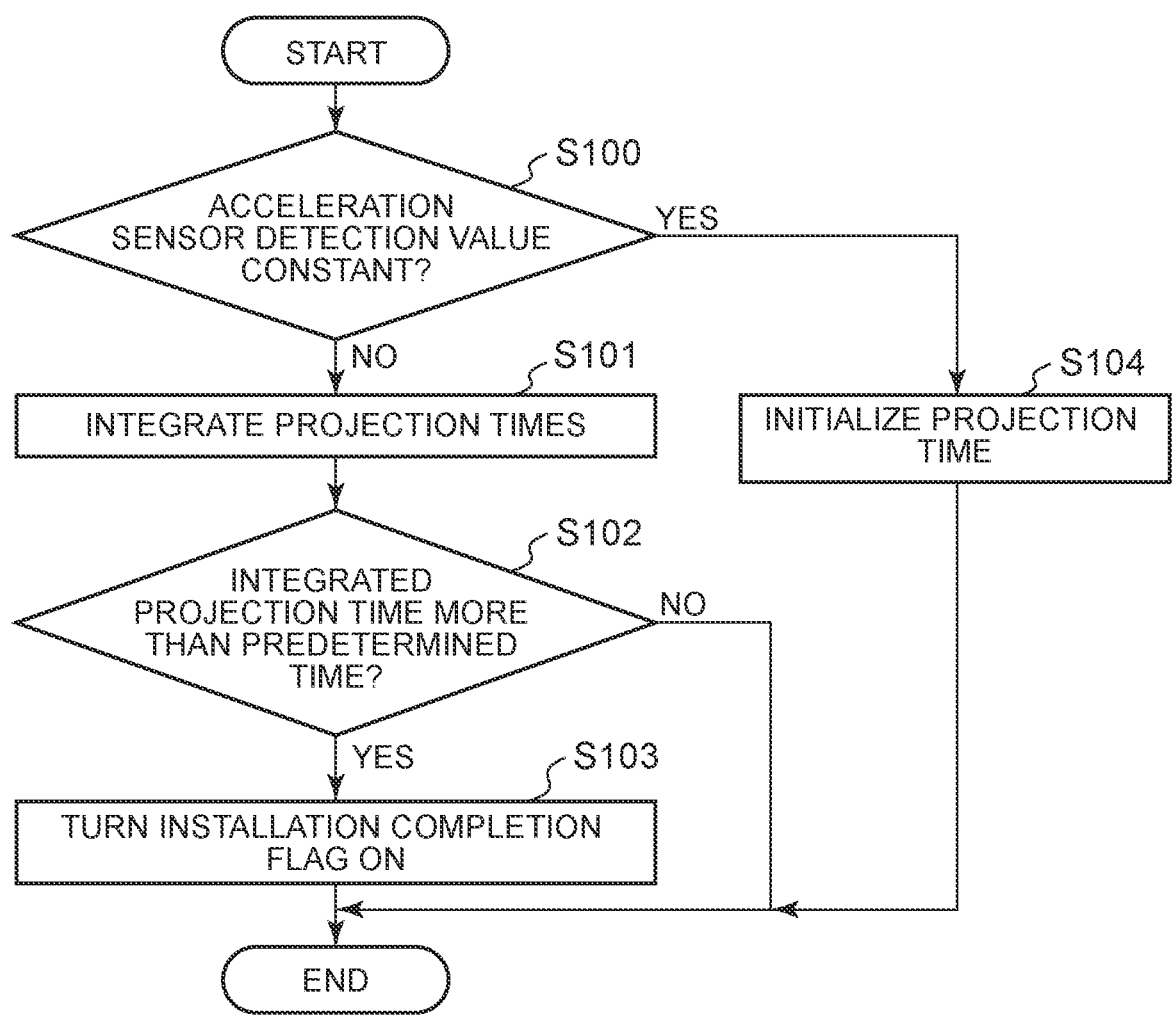
FIG. 14 is a flowchart illustrating one example of a process (an eighth process) of detecting completion of installation.

FIG. 14 is a flowchart illustrating one example of a process of detecting completion of installation (an eighth process). This process is a subroutine which is called in step S12 in FIG. 6.

In step S100, the CPU 11 decides whether the detection value which is detected by the acceleration sensor 112 is constant. That the detection value which is detected by the acceleration sensor 112 is constant means that the difference between the detection value which is detected by the acceleration sensor 112 and the saved value which is saved, for example, in the EEP-ROM 111 is less than the predetermined value. In a case where the detection value which is detected by the acceleration sensor 112 is constant (Yes), the CPU 11 initializes the projection time (S104) and terminates execution of the process in FIG. 14.

In a case where the detection value which is detected by the acceleration sensor 112 is not constant (No), the CPU 11 integrates the projection times (S101). In step S102, the CPU 11 decides whether the integrated projection time is more than the predetermined time.

In a case where the integrated projection time is more than the predetermined time (Yes), the CPU 11 turns the installation completion flag on (S103) and terminates execution of the process in FIG. 14. In a case where the counted cumulative number of times that the power source is turned on is less than the predetermined number of times (No), the CPU 11 terminates execution of the process in FIG. 14.

That is, in a case where the integrated projection time which is obtained after the detection value which is detected by the acceleration sensor 112 falls within the predetermined range exceeds the predetermined time, the CPU 11 decides that installation of the housing of the projector 1 on the predetermined installation surface is completed.

In a case where the projector 1 is installed in the ceiling-suspended state, the detection value which is detected by the acceleration sensor 112 ceases to change. However, in a case where the installation completion flag is turned on in accordance with a decision that the detection value which is detected by the acceleration sensor 112 ceases to change, there is a fear that in a case where the user finely adjusts the installation angle and so forth after the installation completion flag is turned on, the finely adjusted installation angle and so forth may be erroneously decided as the deterioration of the housing and the cracks in the housing. Therefore, here, in a case where the integrated projection time which is obtained after the detection value which is detected by the acceleration sensor 112 ceases to change exceeds the predetermined time, the CPU 11 decides that installation of the housing of the projector 1 on the predetermined installation surface is completed. Thereby, it becomes possible to avoid erroneous decision induced by the fine adjustment which is performed after installation of the projector 1 in the ceiling-suspended state.

Figure 15:
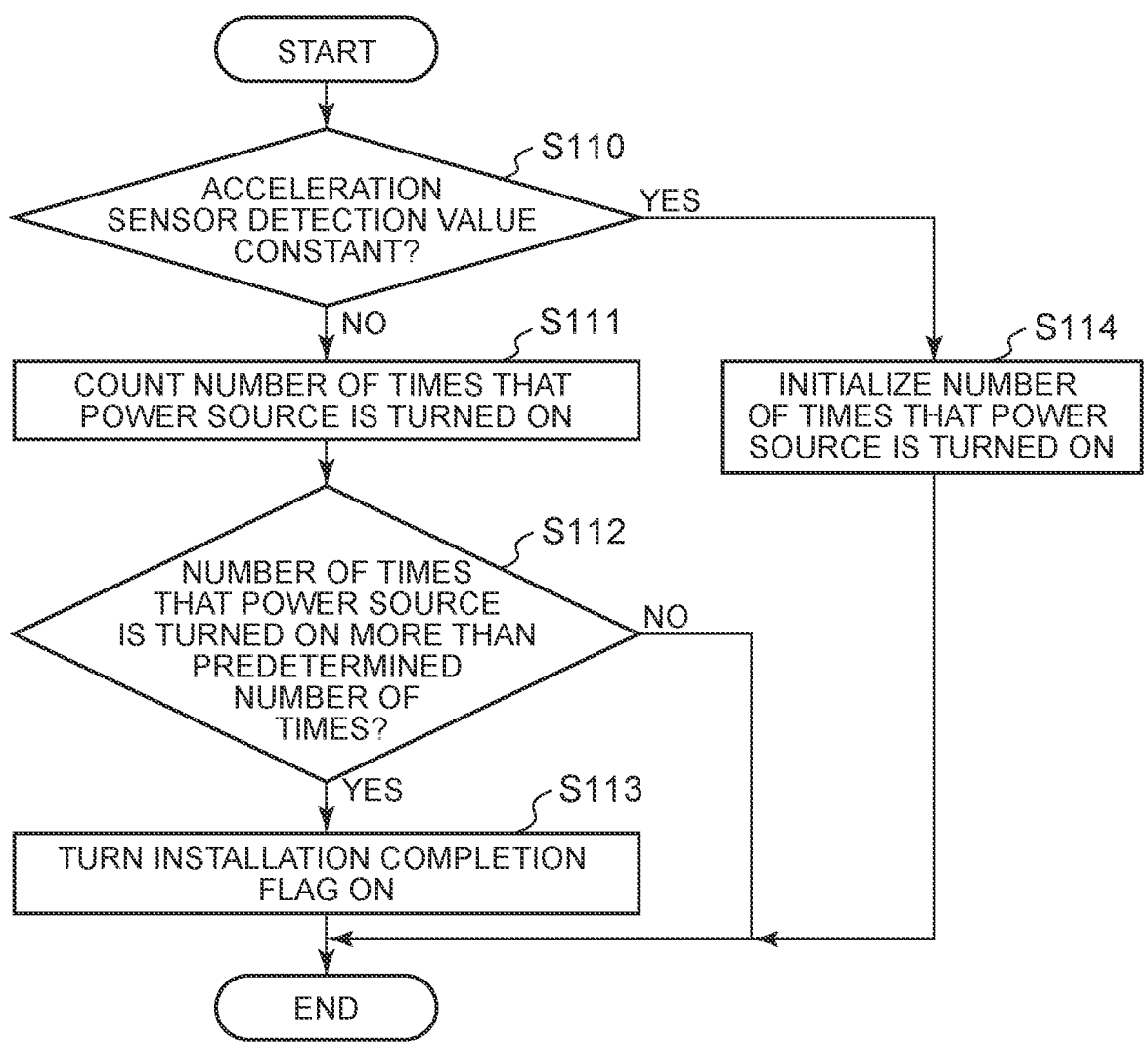
FIG. 15 is a flowchart illustrating one example of a process (a ninth process) of detecting completion of installation.

FIG. 15 is a flowchart illustrating one example of a process of detecting completion of installation (a ninth process). This process is a subroutine which is called in step S12 in FIG. 6.

In step S110, the CUP 11 decides whether the detection value which is detected by the acceleration sensor 112 is constant. That the detection value which is detected by the acceleration sensor 112 is constant means that the difference between the detection value which is detected by the acceleration sensor 112 and the saved value which is saved in, for example, the EEP-ROM 111 is less than the predetermined value. In a case where the detection value which is detected by the acceleration sensor 112 is constant (Yes), the CPU initializes the number of times that the power source is turned on (S114) and terminates execution of the process in FIG. 15.

In a case where the detection value which is detected by the acceleration sensor 112 is not constant (No), the CPU 11 counts the cumulative number of times that the power source is turned on (S111). In step S112, the CPU 11 decides whether the counted cumulative number of times that the power source is turned on is more than the predetermined number of times.

In a case where the counted cumulative number of times that the power source is turned on is more than the predetermined number of times (Yes), the CPU 11 turns the installation completion flag on (S113) and terminates execution of the process in FIG. 15. In a case where the counted cumulative number of times that the power source is turned on is less than the predetermined number of times (No), the CPU 111 terminates execution of the process in FIG. 15.

That is, in a case where the counted cumulative number of times that the power source is turned on which is obtained after the detection value which is detected by the acceleration sensor 112 falls within the predetermined range exceeds the predetermined number of times, the CPU 11 decides that installation of the housing of the projector 1 on the predetermined installation surface is completed.

In a case where the projector 1 is installed in the ceiling-suspended state, the detection value which is detected by the acceleration sensor 112 ceases to change. However, in a case where the installation completion flag is turned on in accordance with a decision that the detection value which is detected by the acceleration sensor 112 ceases to change, there is a fear that in a case where the user finely adjusts the installation angle and so forth after the installation completion flag is turned on, the finely adjusted installation angle and so forth may be erroneously decided as the deterioration of the housing and the cracks in the housing. Therefore, here, in a case where the cumulative number of times that the power source is turned on which is obtained after the detection value which is detected by the acceleration sensor 112 ceases to change exceeds the predetermined number of times, the CPU 11 decides that installation of the housing of the projector 1 on the predetermined installation surface is completed. Thereby, it becomes possible to avoid the erroneous decision induced by the fine adjustment which is performed after installation of the projector 1 in the ceiling-suspended state.

(Modifications)

The present invention is not limited to the above embodiment and it is possible to modify the embodiment within the range not deviating from the gist of the present invention. Modifications such as those which are shown, for example, in the following (a) to (d) are conceived of.

(a) The process of detecting completion of installation may be a combination of the plurality of processes in FIG. 8 to FIG. 16.

(b) The acceleration sensor 112 is not limited to a three-axis detection sensor and any sensor may be used as long as the sensor is of the type of detecting only the front-back inclination and the left-right inclination of the housing.

(c) The system of the projector 1 is not limited to the DLP (a registered trademark) system and may be any of a cathode-ray tube system, a transmission type liquid crystal system and a reflection type liquid crystal system, that is, there is no limitation.

(d) The warning may be given by comparing the difference between the saved value and the detection value which is detected the acceleration sensor 112 with a single threshold value and further messages may be given step by step respectively by comparing the difference with each of three or more threshold values, that is, there is no limitation.

What is claimed is:

1. A projection apparatus comprising:
at least one processor; and
an acceleration sensor which detects an inclination of the projection apparatus, wherein
the processor performs the processes of
acquiring a difference between i) a first detection value which is detected by the acceleration sensor in a case where the projection apparatus is installed on an installation surface and ii) a second detection value which is detected by the acceleration sensor at a time which comes after the installation of the projection apparatus with the projection apparatus on the installation surface, and
in a case where the difference becomes more than a threshold value, controlling to notify a warning at a predetermined timing by functioning as a notification unit or to stop functions of the projection apparatus.

2. The projection apparatus according to claim 1, wherein the processor
sets a detection value which is detected by the acceleration sensor at the first start-up time which comes after installation of the projection apparatus on the installation surface, as the first detection value.

3. The projection apparatus according to claim 1, wherein the predetermined timing comes immediately after the difference reaches the threshold value or comes at a time point that a power source is turned on next.

4. The projection apparatus according to claim 1, wherein the threshold value that the processor uses in a case of stopping the functions of the projection apparatus is larger than the threshold value which is used in a case of giving the warning.

5. The projection apparatus according to claim 1, wherein in a case where the processor accepts an operation for completion of installation, the processor decides that installation of the projection apparatus on the installation surface is completed.

6. The projection apparatus according to claim 1, wherein in a case where the processor accepts the first power source turning-off operation after a ceiling suspension setting, the processor decides that installation of the projection apparatus on the installation surface is completed.

7. The projection apparatus according to claim 1, wherein in a case where the processor accepts the first power source turning-off operation after projection of a built-in pattern for installation, the processor decides that installation of the projection apparatus on the installation surface is completed.

8. The projection apparatus according to claim 1, wherein in a case where an integrated projection time exceeds a predetermined time, the processor decides that installation of the projection apparatus on the installation surface is completed.

9. The projection apparatus according to claim 1, wherein in a case where the number of times that a power source is turned on exceeds a predetermined number of times, the processor decides that installation of the projection apparatus on the installation surface is completed.

10. The projection apparatus according to claim 1, wherein in a case where an integrated projection time which is obtained after accepting installation-related settings exceeds a predetermined time, the processor decides that installation of the projection apparatus on the installation surface is completed.

11. The projection apparatus according to claim 10, wherein the installation-related settings include at least one of a keystone correction setting, a ceiling-suspended projection setting, a rear projection setting, a digital screen shift setting, a zoom setting, a focus setting and an installation environment setting.

12. The projection apparatus according to claim 1, wherein in a case where the number of times that the power source is turned on and which is obtained after accepting installation-related settings exceeds a predetermined number of times, the processor decides that installation of the projection apparatus on the installation surface is completed.

13. The projection apparatus according to claim 12, wherein the installation-related settings include at least one of a keystone correction setting, a ceiling-suspended projection setting, a rear projection setting, a digital screen shift setting, a zoom setting, a focus setting and an installation environment setting.

14. The projection apparatus according to claim 1, wherein in a case where the integrated projection time which is obtained after the detection value of the acceleration sensor falls within a predetermined range exceeds a predetermined time, the processor decides that installation of the projection apparatus on the installation surface is completed.

15. The projection apparatus according to claim 1, wherein in a case where the number of times that the power source is turned on and which is obtained after the detection value of the acceleration sensor falls within a predetermined range exceeds a predetermined number of times, the processor decides that installation of the projection apparatus on the installation surface is completed.

16. An installed-state detection method for use in a projection apparatus which includes at least one processor and an acceleration sensor, comprising:
acquiring a difference between i) a first detection value which is detected by the acceleration sensor in a case where the projection apparatus is installed on an installation surface and ii) a second value which is detected by the acceleration sensor at a time which comes after the installation of the projection apparatus with the projection apparatus on the installation surface, and
in a case where the difference becomes more than a threshold value, controlling to notify a warning at a predetermined timing by functioning as a notification unit or to stop functions of the projection apparatus.

17. A non-transitory computer-readable medium in which a program used for controlling a computer of a projection apparatus which includes at least one processor and an acceleration sensor which detects inclination is stored, wherein
a difference between i) a first detection value which is detected by the acceleration sensor in a case where the projection apparatus is installed on an installation surface and ii) a second value which is detected by the acceleration sensor at a time which comes after the installation of the projection apparatus with the projection apparatus on the installation surface is acquired, and
in a case where the difference becomes more than a threshold value, a warning is notified at a predetermined timing by functioning as a notification unit or functions of the projection apparatus are stopped.

* * * * *